United States Patent [19]

Nakamura

[11] Patent Number: 5,577,257
[45] Date of Patent: Nov. 19, 1996

[54] INFORMATION PROCESSING APPARATUS

[75] Inventor: Kazuhiro Nakamura, Tokyo, Japan

[73] Assignee: Canon Kabushiki Kaisha, Tokyo, Japan

[21] Appl. No.: 7,810

[22] Filed: Jan. 22, 1993

Related U.S. Application Data

[63] Continuation of Ser. No. 236,160, Aug. 25, 1988, abandoned.

[30]       Foreign Application Priority Data

Aug. 27, 1987  [JP]  Japan ................................. 62-214030
Aug. 31, 1987  [JP]  Japan ................................. 62-218251
Aug. 31, 1987  [JP]  Japan ................................. 62-218252

[51] Int. Cl.$^6$ ............................. G06F 9/00; G06F 13/00
[52] U.S. Cl. ................ 395/800; 364/952.1; 364/975.1; 364/975.2; 364/943.43; 364/DIG. 2
[58] Field of Search ................................... 395/375, 650, 395/700

[56]            References Cited

U.S. PATENT DOCUMENTS

| | | | |
|---|---|---|---|
| 4,355,389 | 10/1982 | Sata et al. ................................. | 371/18 |
| 4,679,166 | 7/1987 | Berger et al. ............................ | 364/900 |
| 4,742,485 | 5/1988 | Carlson et al. .......................... | 364/900 |
| 4,775,953 | 10/1988 | Goettelmann et al. ................. | 364/900 |
| 4,789,985 | 12/1988 | Akahoshi et al. ...................... | 364/200 |
| 4,926,373 | 5/1990 | Takenaka ................................. | 364/900 |
| 4,947,315 | 8/1990 | Sokolow et al. ........................ | 395/650 |
| 5,068,783 | 11/1991 | Tanagawa et al. ..................... | 395/375 |
| 5,115,410 | 5/1992 | Hirata et al. ............................ | 395/650 |

FOREIGN PATENT DOCUMENTS 58-123128   7/1983   Japan .
58-182734  10/1983   Japan .

*Primary Examiner*—Kevin J. Teska
*Assistant Examiner*—Ayni Mohamed
*Attorney, Agent, or Firm*—Fitzpatrick, Cella, Harper & Scinto

[57]              ABSTRACT

An information processing apparatus having two or more functions, in which one of the functions is automatically selected according to the state of an external memory device, or according to the actuated one of plural input devices, without an instruction by the operator.

16 Claims, 9 Drawing Sheets

INFORMATION PROCESSING APPARATUS

This application is a continuation of application Ser. No. 07/236,160 filed Aug. 25, 1988, which is now abandoned.

BACKGROUND OF THE INVENTION

1. Field of the Invention

The present invention relates to an information processing apparatus provided with input means.

2. Related Background Art

In such conventional information processing apparatus, the input device (unit) such as a keyboard or an operation panel has usually been used exclusively for such apparatuses, and the apparatus has usually been designed to function only in response to such an exclusive input device. Even when the information processing apparatus has been designed to cooperate with several input devices, it has been necessary to give an instruction in advance to the information processing apparatus and to connect an instructed input device as a component.

Also such apparatus has required the selection of a function prior to the start of the power supply, or has been designed to work in a predetermined function after the start of the power supply, so that another function has required instruction by particular instruction means. Besides, in an information processing apparatus in which the function is selected according to the initial state of the system and the state of the external memory device at the start of the power supply, the function has been determined solely by the state of the external memory.

SUMMARY OF THE INVENTION

In consideration of the foregoing, the object of the present invention is to provide an information processing apparatus which enables the operator to use an arbitrary input device as the input means for the apparatus.

The above-mentioned drawbacks can be resolved, according to the present invention, by the use of discrimination means for discriminating the kind of input device connected to an input terminal, and input process means for processing the input signal from the input terminal in automatic response to the kind of input device, according to the result of the discrimination.

According to the above-explained structure, there is provided an information processing apparatus which can be economically connected to plural input devices and in which the operator can use any input device, regardless of the kind thereof, as the input means.

Also the above-mentioned drawbacks can be resolved, according to the present invention, by an information processing apparatus provided with detection means for detecting the initial state of the external memory device and discrimination means for discriminating the stored content of the external memory device, wherein an abnormal operation of the system is prevented and the function of the apparatus can be easily determined, at the start of the power supply, by the operator.

DETAILED DESCRIPTION OF THE PREFERRED EMBODIMENTS

The present invention will be clarified in detail by an embodiment thereof shown in the attached drawings.

Figure 1:
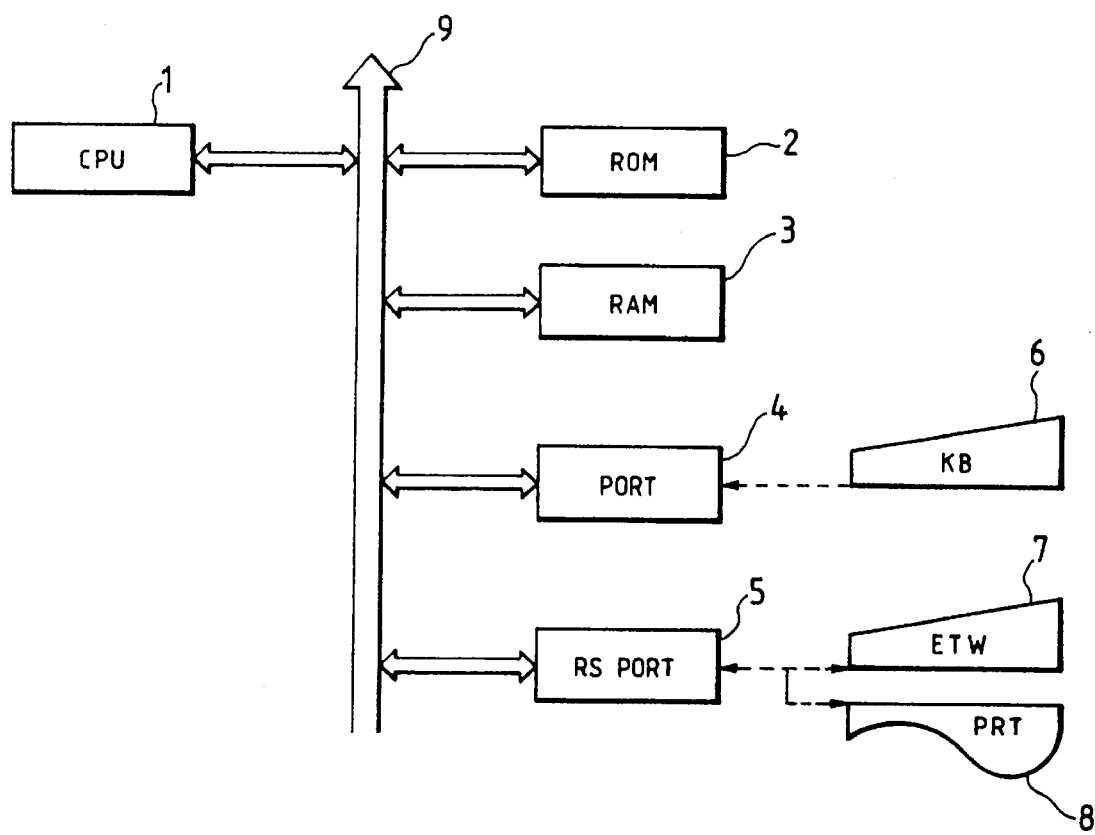
FIG. 1 is a block diagram of an information processing apparatus embodying the present invention.
Figure 3A:
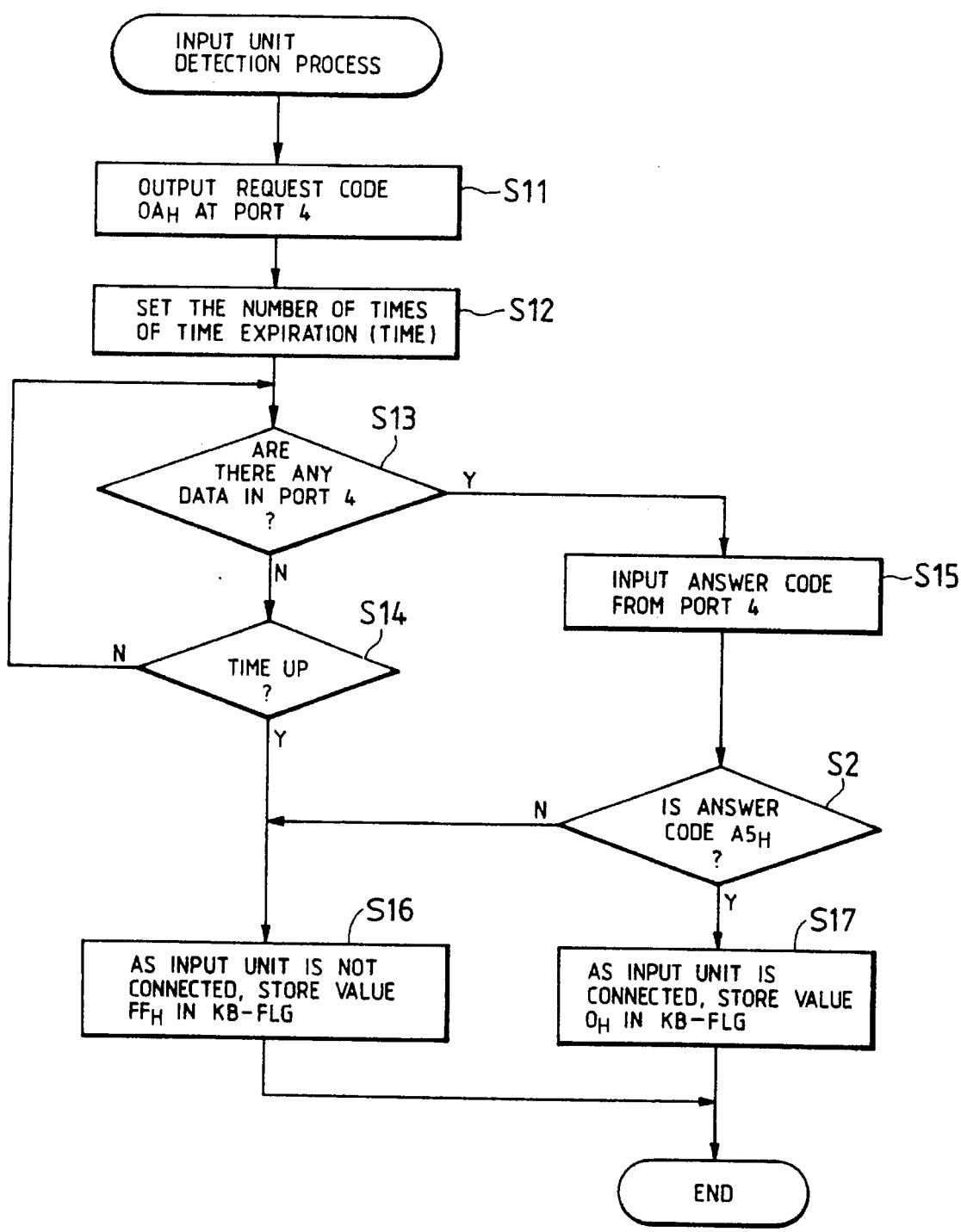
FIG. 3A is a flow chart showing sequence of input device detection.

FIG. 1 is a block diagram showing an embodiment of the present invention, wherein there are shown a central processing unit (CPU) 1 for controlling various component units to be explained later, connected through a bus 9; a read only memory (ROM) 2 for storing control sequences of the CPU 1, according to the flow charts shown in FIGS. 3A and 3B; a random access memory 3 for temporary storage of various data; a port 4 for connecting, for example, a keyboard (KB) 6 constituting an input device; and a serial interface communication port (RSPORT) 5 for connecting, for example, an electronic typewriter (ETW) 7 constituting an input/output unit and a printer (PRT) 8 constituting an output device.

Figure 2:
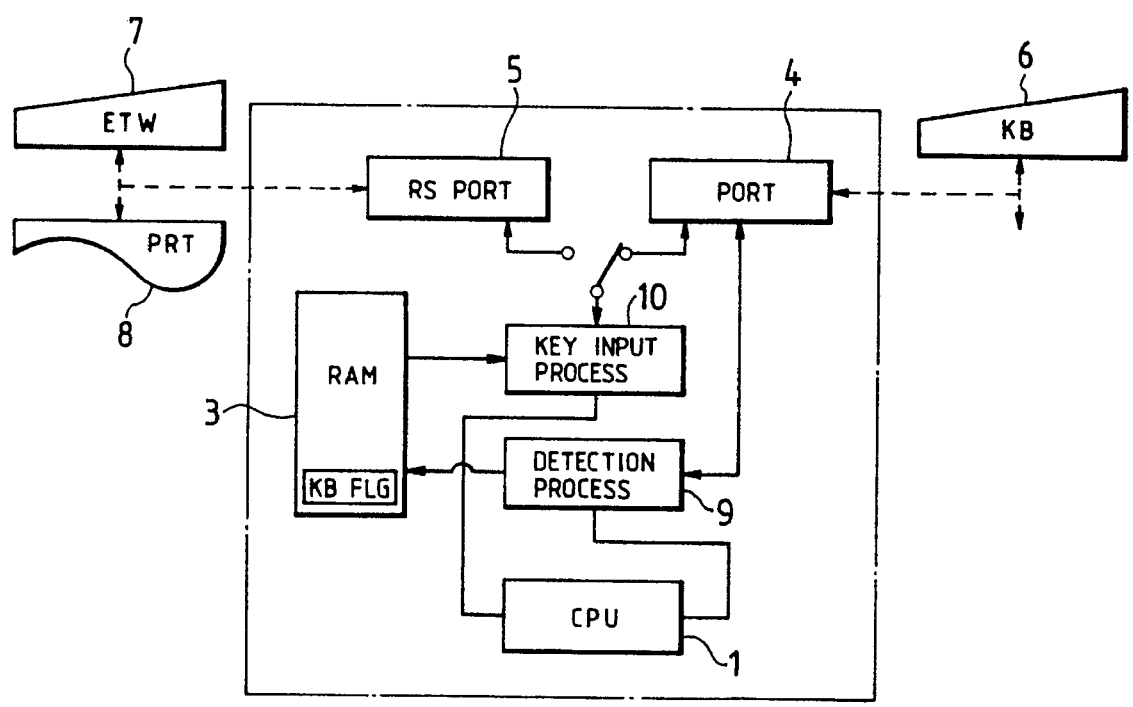
FIG. 2 is a schematic view showing the function of the above-mentioned embodiment.

Now reference is made to FIG. 2 for explaining the function of the embodiment explained above.

In the present embodiment, in response to the start of power supply, an input device detection process a stored in the ROM 2 is activated under the control of the CPU 1 to send a request code to the port 4. When the keyboard 4 is connected, an answer code is supplied therefrom to the port 4. On the other hand, if the keyboard 6 is not connected, the port 4 cannot receive the answer code within a predetermined period. Connection of a proper keyboard 6 is identified when a correct code is obtained, while the keyboard 6 is identified as not connected if a code is not received, or is received but not correct, and the result is represented by a flag KB-FLG in the RAM 3. A next key input process 10 stored in the ROM 2 refers to the state of the flag KB-FLG in the RAM 3, and the key input is conducted through the port 4 and the serial interface communication port (RSPORT) 5 is used as an output port in the normal process, if the keyboard 6 is connected. On the other hand, if the keyboard 6 is not connected, the key input is conducted through the serial interface communication port 5 which is connected to an input device and the port serves also as an output port.

In the following there will be given a more detailed explanation of the function, with reference to flow charts. FIG. 3A shows an input device detection process. When this routine is activated, a step S11 releases a request code $OA_H$ to a port 4. Then a step S13 checks the presence of an answer code of the keyboard 6 at the port 4, and, if absent, a step S14 discriminates whether a time-out period set in a step S12 has been exceeded, and, if not, the sequence returns to the step S13. On the other hand, in case of presence of the code in the step S13, a step S15 enters the answer code from the port 4. Then a step S2 discriminates whether a correct answer identification code has been obtained, and, if obtained, a step S3 stores a value $O_H$ as a flag KB-FLG in the RAM 3 in step S17, indicating that the keyboard 6 is connected to the port 4. On the other hand, if not obtained, or if the time-out period has expired in the step S14, a value $FF_H$ is stored as the flag KB-FLG in step S16, indicating no connection to the port 4. The sequence is terminated in this manner.

Figure 3B:
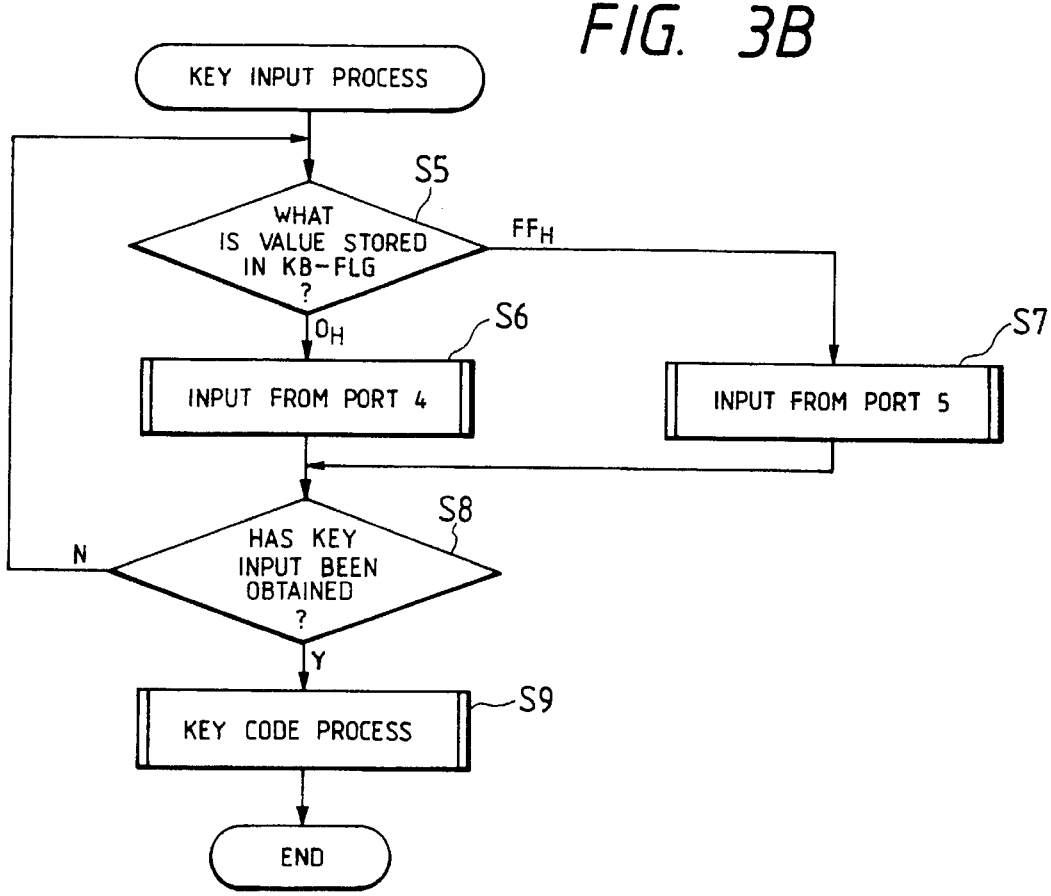
FIG. 3B is a flow chart showing a sequence of key input.

FIG. 3B shows a key input sequence, in which a step S5 refers to the value of the flag KB-FLG, thereby classifying the cases of key input process. If the value is $O_H$, indicating the connection of the keyboard 6 to the port 4, a step S6 executes a key input process from the port 4. If the value is $FF_H$, indicating the absence of connection to the port 4, a step S7 executes a key input process from the communication port RSPORT 5 to which the electronic typewriter 7 is connected. A step S8 discriminates whether a key input has been obtained, and, if obtained, the sequence proceeds to a step S9. If not obtained, the sequence returns to the step S5. The step S9 applies a predetermined process to the obtained key code, and the process is terminated.

In the foregoing embodiment the connection of input device is detected at the start of power supply, but it is also possible to change the input device in the course of a processing by making it possible to activate the detection process by particular instruction means.

Also in the foregoing embodiment the key input process is varied according to the presence or absence of connection of the input device in a detection process, but such variation may be conducted according to the kind of connected input device. For example, if a cursor pad for designating the data position is connected to the port 4 for complementing the functions of the electronic typewriter 7 connected to the communication port RSPORT 5, it is necessary to obtain key inputs from both ports, and it is also possible to constitute the key input process accordingly.

The foregoing embodiment detects the connected input device and automatically selects the input process according to the result of the detection, whereby a desired input device can be used without instruction by the operator. Also since the input process is executed corresponding to each input device, it is possible to prevent unnecessary processing and to reduce the time required for processing. Besides it is possible to effectively utilize the input and output terminals.

Another Embodiment

In the following there will be explained another embodiment of the present invention.

Figure 4:
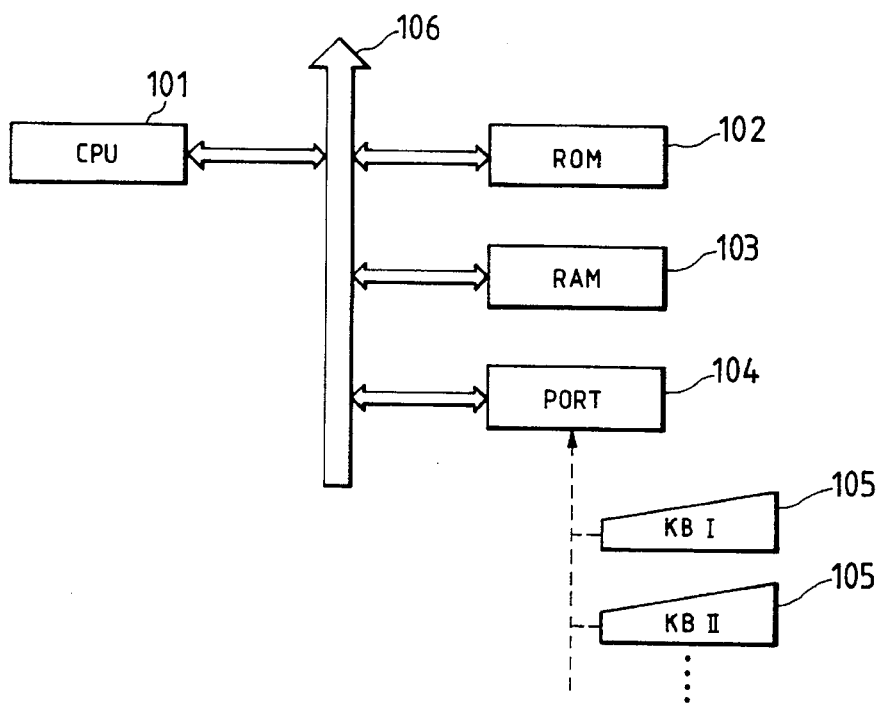
FIG. 4 is a block diagram of an information processing apparatus constituting another embodiment of the present invention.
Figure 6:
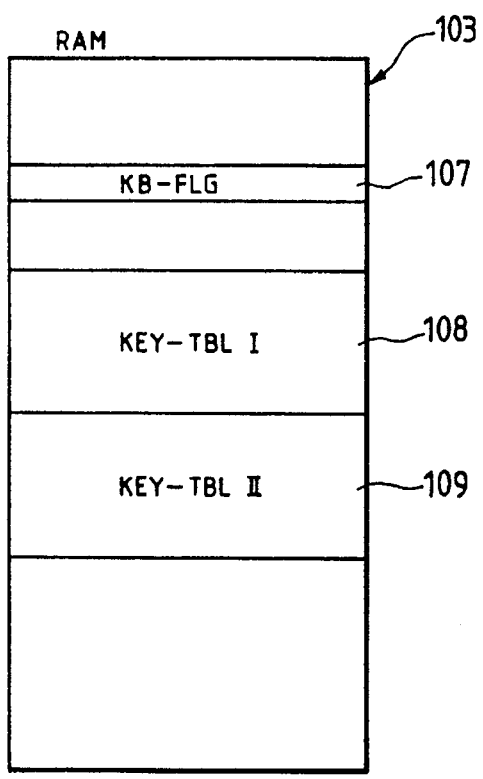
FIG. 6 is a schematic view of the map of a RAM.
Figure 7A:
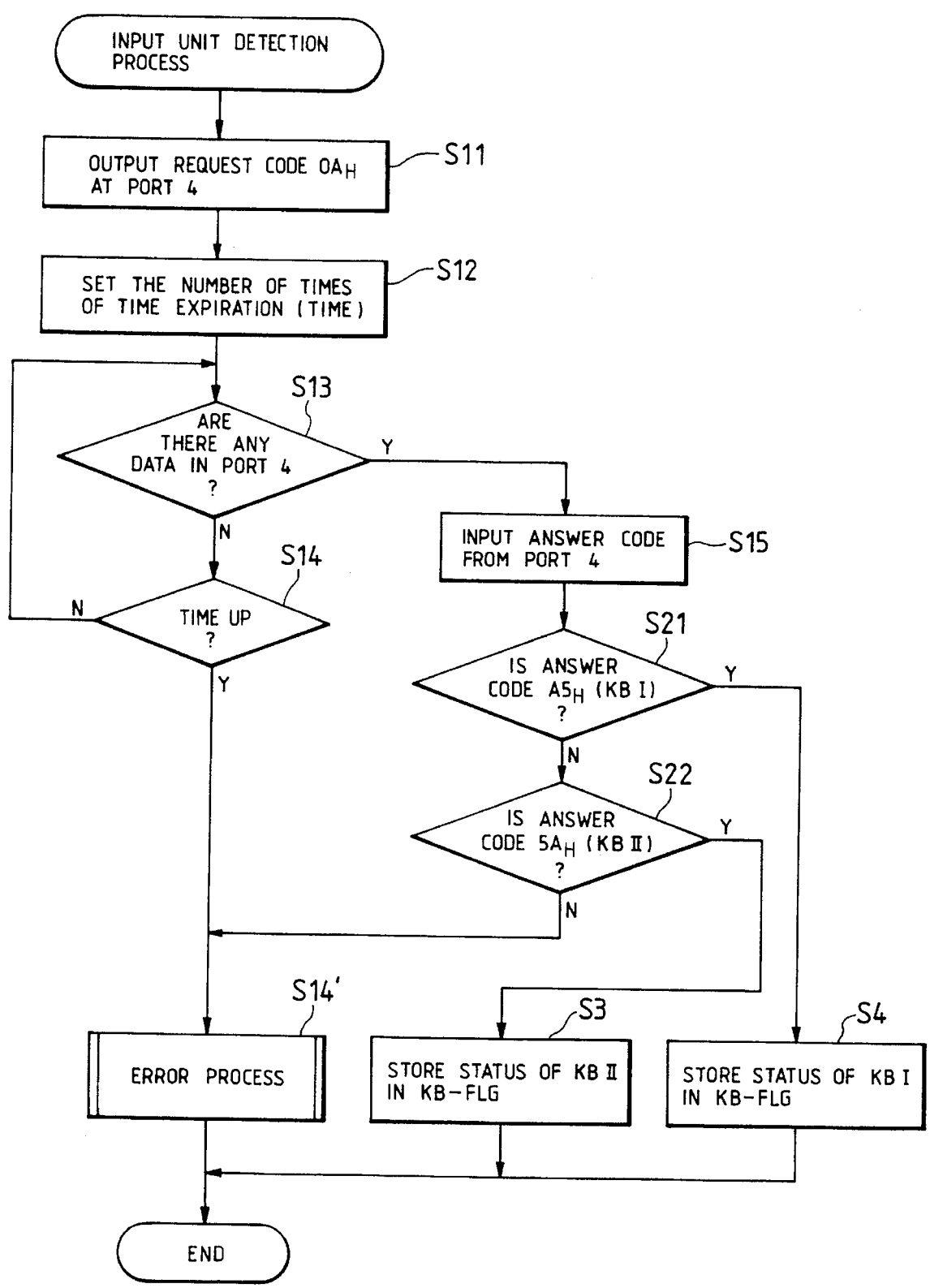
FIG. 7A is a flow chart showing a sequence of input device discrimination.

FIG. 4 is a block diagram of the embodiment, wherein there are shown a central processing unit (CPU) 101 for controlling various component units to be explained later, connected through a bus 106; a read-only memory (ROM) 102 for storing programs corresponding to the flow chart shown in FIGS. 7A and 7B; a random access memory (RAM) 103 for temporary storage of various data, having memory areas as shown in FIG. 6; and a port 104 for connecting various input devices (KBI, II) 105.

Figure 5:
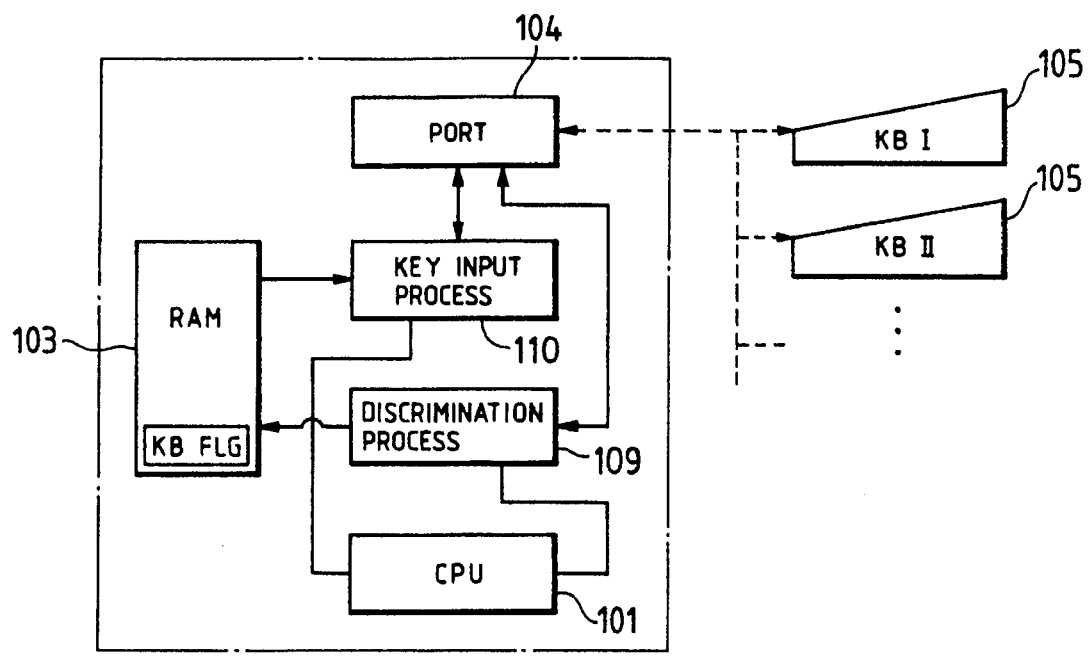
FIG. 5 is a schematic view showing the function of the above-mentioned embodiment.

Now reference is made to FIG. 5 for explaining the function of the embodiment explained above.

In the present embodiment, in response to the start of power supply, an input device detection process 109 stored in the ROM 102 is activated under the control of the CPU 101 to send a request code to the port 104. The input devices 105 (keyboards KBI, KBII) connected to the port 104 respectively release answer codes according to the kind of the input devices. According to the answer code entered from the port 104, there is discriminated whether the input device 105 is a keyboard KBI or KBII, and the obtained result is represented by a flag KB-FLB 107 in the RAM 103 shown in FIG. 6.

When a key input is made from the input device 105, a corresponding key input process 110 is selected from the ROM 102, according to the value of the flag KB-FLG 107 in the RAM 103.

In the following there will be given a detailed explanation on the function, with reference to the flow charts shown in FIGS. 7A and 7B. FIG. 7A shows an input device detection process. When the process is activated, a step S11 releases a request code $OA_H$ to the port 104, and a step S13 checks the presence of an answer code of the input device 105 at the port 104, and if absent, a step S14 discriminates whether a time-out period set in a step S12 has been exceeded, and, if not, the sequence returns to the step S13. On the other hand, in case of presence of the code in the step S13, a step S15 enters the answer code from the port 4. Then a step S21 discriminates whether the obtained answer identification code is $A5_H$:KBI, and, if not, a step S22 discriminates whether it is $5A_H$:KBII. Results of the discriminations in the steps S21 and S22 are represented by flags KB-FLG respectively in steps S4 and S3. If the discrimination in the step S22 is negative, or if the time-out period has expired in the step S14, a step S14' executes an error process, and the sequence is terminated.

Figure 7B:
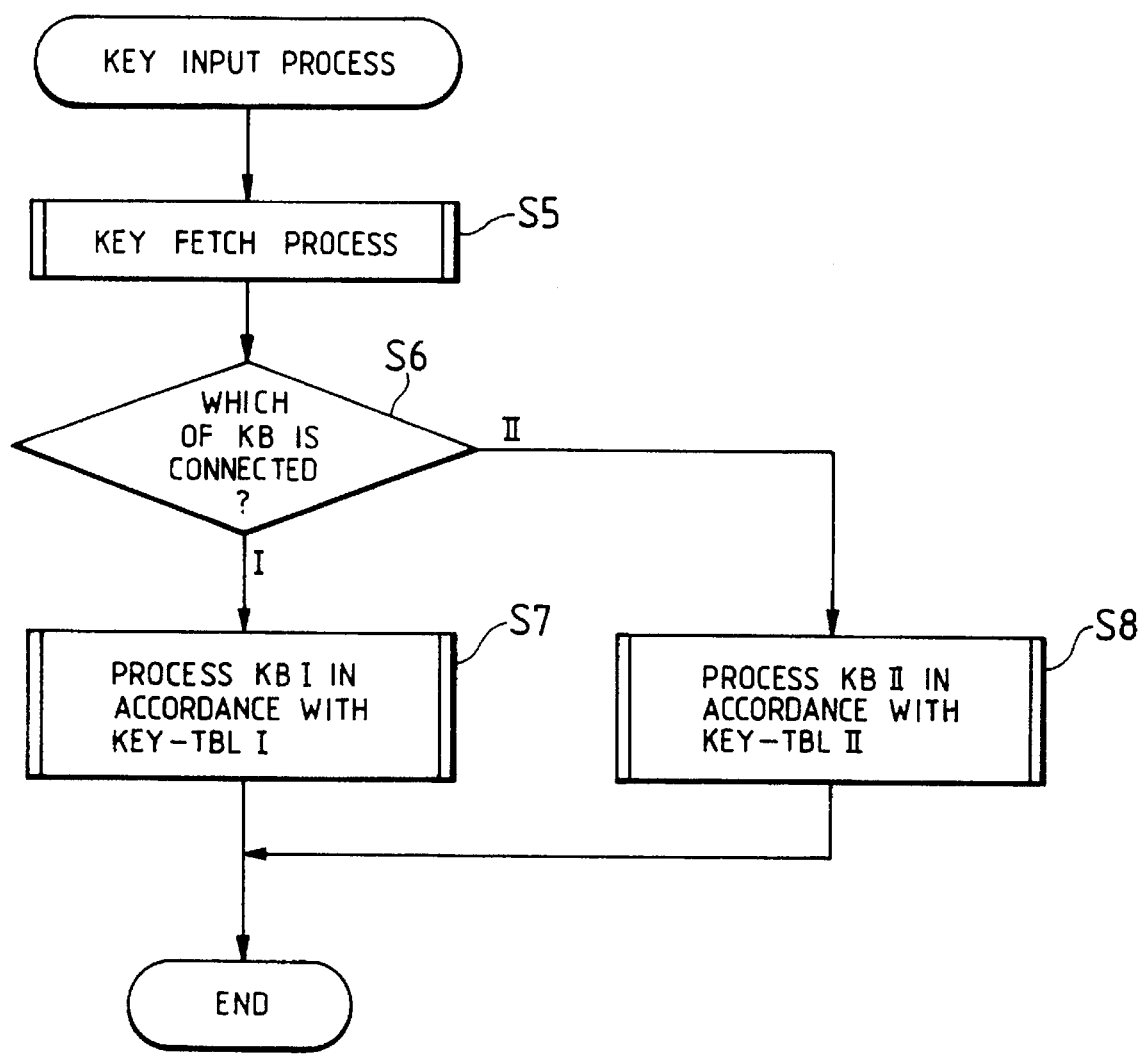
FIG. 7B is a flow chart showing a sequence of key input.

FIG. 7B shows a key input process. A step S5 executes a key input fetching, and, in the presence of a key input, a step S6 selects the key process, referring to the value of the flag KB-FLG. If it is "0", a step S7 processes the entered key signal according to a key code table for KBI, stored in an area KEY-TBLI in the RAM 103 shown in FIG. 6. On the other hand, if the flag is "1", a step S8 process the entered key signal according to a key code table for KBII, stored in an area KEY-TABLII. The process is terminated in this manner.

In the foregoing embodiment input devices are identified at the start of the power supply, but it is also possible to change the input device in the course of processing by enabling the detection process by particular instruction means.

Also the foregoing embodiment two input devices KBI and KBII, but the number and types of input devices is not limited, and a similar effect can be obtained with two or more input devices.

The foregoing embodiment identifies the connected input devices and automatically selects the input processes according to the result of the identification, whereby a desired input device can be used without instruction by the operator. Also since the input process is executed corresponding to each input device, it is possible to prevent unnecessary processing and to reduce the time required for processing.

Another Embodiment

Figure 8:
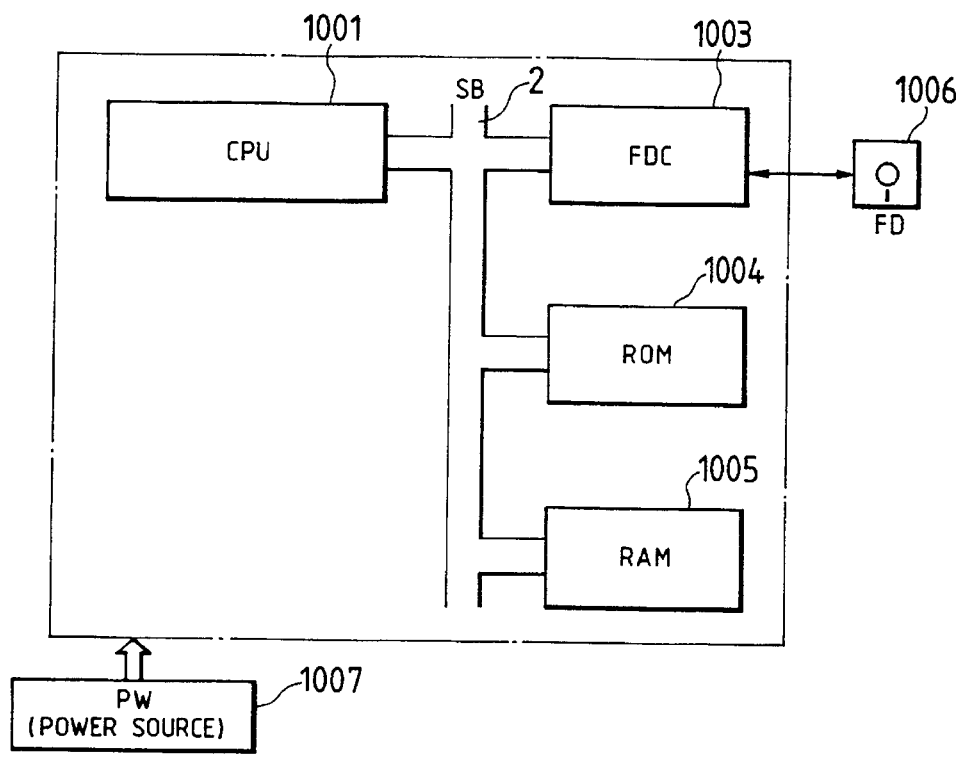
FIG. 8 is a block diagram of an information processing apparatus constituting still another embodiment of the present invention.

In the following, there will be explained another embodiment of the present invention, which is represented in FIG. 8 as a block diagram.

Figure 10A:
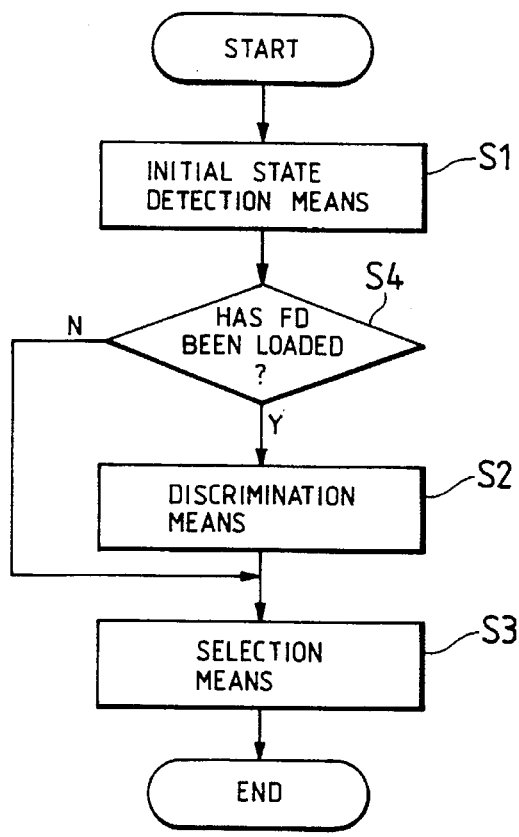
FIG. 10A is a flow chart showing the outline of the control sequence in the above-mentioned embodiment.
Figure 10B:
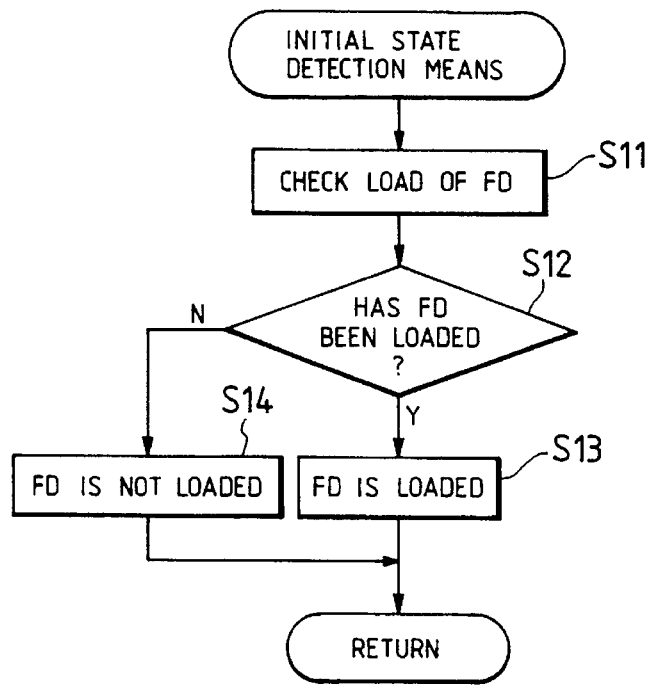
FIGS. 10B, 10C and 10D are flow charts respectively showing the sequences of the initial state detection means, discrimination means, and selection determination means.

In FIG. 8, there are shown a central processing unit (CPU) 1001 for controlling various units to be explained later, mutually connected through a bus 1002; a floppy disk controller (FDC) 1003 constituting an external memory and executing confirmation of a loaded floppy disk (FD) 1006 and data writing thereon and data reading therefrom; a read-only memory (ROM) 1004 storing control programs for word processing and those corresponding to the flow charts shown in FIGS. 10A and 10B; a random access memory (RAM) 1005 used as a program area loaded from the floppy disk 1006 and work areas for various data; and a power source 1007 for supplying electric power to various components.

Figure 9:
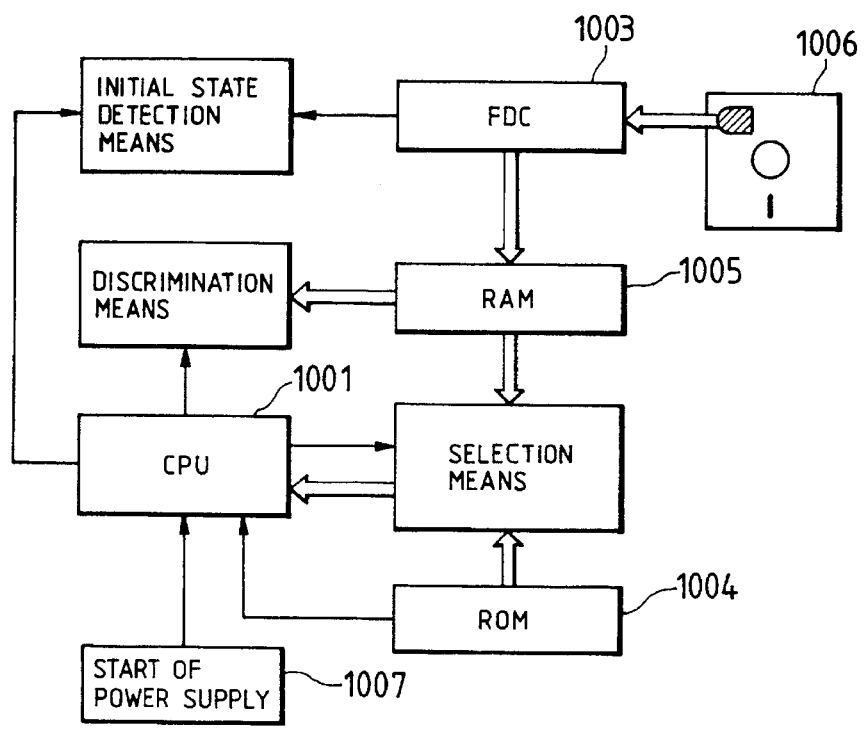
FIG. 9 is a block diagram showing the function structure of the above-mentioned embodiment.

Now reference is made to FIG. 9 for explaining the function of the present embodiment.

When the power supply by the power source 1007 is started, initial state detecting means detects the state of the floppy disk controller 1003, namely whether the floppy disk 1006 is mounted or not. When the floppy disk 1006 is loaded, discrimination means discriminates whether the floppy disk 1006 is a system disk for a particular function, or a document disk for word processing function. Then selection means determines whether a word processing function under the control of the ROM 1004 or another function under the control of the RAM 1005 of which content is loaded from the floppy disk 1006, and thus the selected function is activated.

Figure 10C:
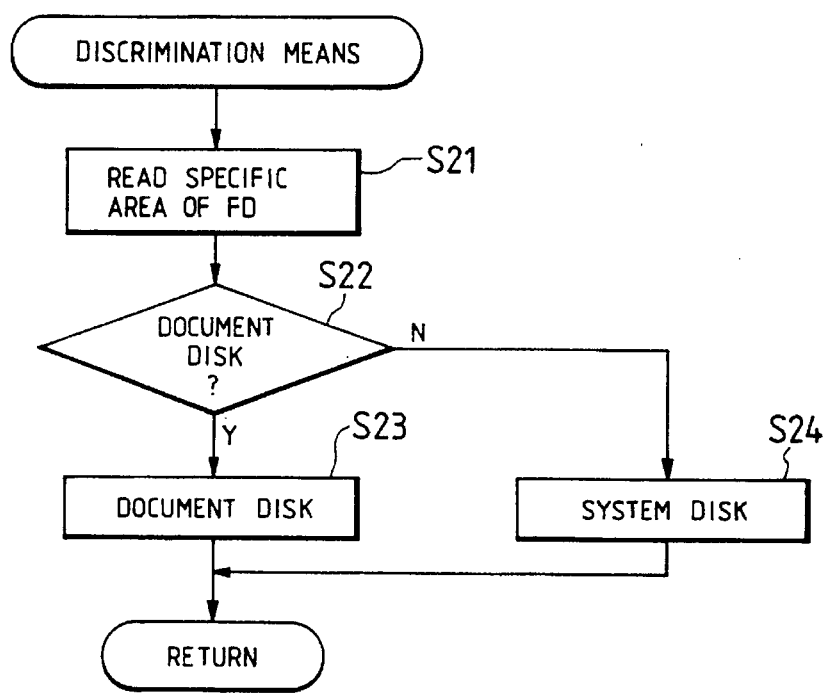
Figure 10D:
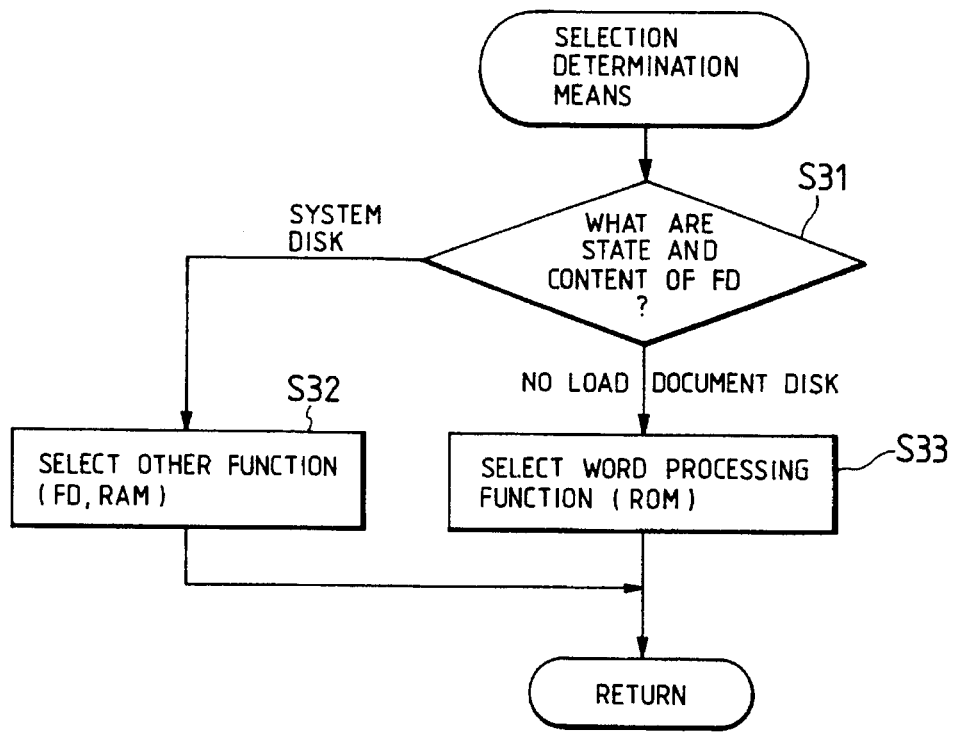

In the following there will be given a more detailed explanation, with reference to the flow charts shown in FIGS. 10A to 10D. FIG. 10A shows the outline of the present embodiment, and various processing means are shown by FIGS. 10B, 10C and 10D. When the power supply by the power source 1007 is started, the initial state of the apparatus is detected by initial state detection means (S1) for detecting whether a floppy disk is loaded in the external memory device (S11, S12), and the presence or absence of disk is stored in the RAM 1005. If the disk is loaded, discrimination means (S2) reads a particular area of the floppy disk 1006 for discriminating the kind thereof (S21), and there is discriminated whether the floppy disk 1006 is a document disk (S22). The discrimination in the present embodiment is made by the presence or absence of a program in a particular area of the disk, and a system disk or a document disk is identified respectively if a program is present or absent in the area. The result of the discrimination is stored in the RAM 1005 and is used in the subsequent process. Then function selection means (S3) selects the function (S31) according to the state (status) of the floppy disk 1006. The word processing function stored in the ROM 1004 is selected if the floppy disk 1006 is not loaded, or if a document disk is loaded. If a system disk is loaded, the program in the loaded system disk 1006 is loaded into the RAM 1005, and the process is selected according to the content of the RAM 1005.

In the foregoing embodiment there has been employed a floppy disk device as the external memory, but a similar result can be obtained with any other external memory device.

The foregoing embodiment automatically determines the function of an information processing apparatus capable of two or more functions, according to the state and content of an external memory. Since the state of the external memory reflects the natural deed of the operator according to the desired function, it is rendered possible to eliminate unnecessary selecting operations and to prevent abnormal functions.

I claim:

1. An information processing apparatus equipped with an external device for detachably installing a memory medium, said apparatus comprising:

a control memory storing a first system program;

medium discriminating means for discriminating whether contents of a memory medium installed in the external device are a second system program or a document;

memory means for storing a discrimination result provided by said medium discriminating means; and a processor device connected to said control memory device via a bus, said processor device continuing to execute the first system program when the discrimination result stored in said memory means indicates that the installed memory medium contains a document, and said processor device loading and executing the second system program from the installed memory medium when the discrimination result stored in said memory means indicates that the installed memory medium contains the second system program.

2. An information processing apparatus according to claim 1, further comprising:

installation discriminating means for discriminating whether the memory medium is installed in the external device.

3. An information processing apparatus according to claim 2, wherein the processor device executes the first system when the memory medium is not installed in the external device.

4. An information processing apparatus according to claim 1, wherein the medium discriminating means comprises means for reading a predetermined portion of the memory medium.

5. An information processing apparatus according to claim 1, wherein the processor device comprises means for loading the second system into a memory from the memory medium when the system medium is installed.

6. An information processing apparatus according to claim 2, wherein the installation discriminating means discriminates whether the memory medium is installed in the external device after turning on a power supply.

7. An information processing apparatus equipment with an external device for installing a memory medium, said apparatus comprising:

input means for entering information;

control memory means storing a first system program;

discriminating means for discriminating whether the memory medium stores a second system program or data obtained by executing the first system program;

memory means for storing the information from the input means and for storing a discrimination result provided by said discriminating means; and control means for controlling information processing in accordance with the first system program when the discrimination result indicates that the installed memory medium contains data obtained by executing the first system program, and for loading the second system program and controlling information processing in accordance with the second system program, when the discrimination result indicates that the installed memory medium contains the second system program.

8. An information processing apparatus according to claim 7, further comprising:

installation discriminating means for discriminating whether the memory medium is installed in the external device.

9. An information processing apparatus according to claim 8, wherein the control means controls information processing in accordance with the first system program when the memory medium is not installed in the external device.

10. An information processing apparatus according to claim 7, wherein the medium discriminating means comprises means for reading a predetermined portion of the memory medium.

11. An information processing apparatus according to claim 7, wherein the control means comprises means for loading the second system program into a memory from the memory medium when the system medium is installed.

12. An information processing apparatus according to claim 8, wherein the installation discriminating means discriminates whether the memory medium is installed in the external device after turning on a power supply.

13. A method for selecting a function in an information processing apparatus equipped with an external device for installing a memory medium, said method comprising the steps of:

turning on a power supply;

discriminating whether the memory medium contains data obtained by earlier execution of a first system program or contains a second system program;

storing a discrimination result obtained in said discriminating step; and continuing to execute the first system program, when the discrimination result indicates that the installed memory medium contains data obtained by earlier execution of the first system program, and loading and executing the second system program, when the discrimination result indicates that the installed memory medium contains the second system program.

14. A method according to claim 13, further comprising:

a step for discriminating whether the memory medium is installed in the external device.

15. A method according to claim 14, further comprising:

a step for executing the first system when the memory medium is not installed.

16. A method according to claim 13, further comprising:

a step for loading the second system into a memory from the system medium when the system medium is installed.

* * * * *